United States Patent
Wu et al.

(10) Patent No.: US 6,795,893 B2
(45) Date of Patent: Sep. 21, 2004

(54) RECORDABLE DISK RECORDING CONTROLLER WITH BATCH REGISTER CONTROLLER

(75) Inventors: Wen-Yi Wu, Hsin Chu County (TW); Jyh-Shin Pan, Hsin Chu City (TW); Chun-Nan Lin, Hsin-Chu (TW)

(73) Assignee: Mediatek Inc., Hsin Chu (TW)

( * ) Notice: Subject to any disclaimer, the term of this patent is extended or adjusted under 35 U.S.C. 154(b) by 461 days.

(21) Appl. No.: 09/748,447

(22) Filed: Dec. 22, 2000

(65) Prior Publication Data

US 2002/0083225 A1 Jun. 27, 2002

(51) Int. Cl.⁷ .............................................. G06F 12/00
(52) U.S. Cl. .............................. 711/111; 711/4; 710/22; 710/308
(58) Field of Search ............................ 710/22, 28, 306, 710/308; 711/4, 111, 112, 154; 365/189.01

(56) References Cited

U.S. PATENT DOCUMENTS 4,716,523 A * 12/1987 Burrus, Jr. et al. ......... 710/308
4,742,448 A * 5/1988 Sander et al. ................ 710/28
4,837,677 A * 6/1989 Burrus, Jr. et al. ......... 711/111
5,940,358 A 8/1999 Kato ............................. 369/84

* cited by examiner

*Primary Examiner*—Donald Sparks
*Assistant Examiner*—Brian R. Peugh
(74) *Attorney, Agent, or Firm*—Birch, Stewart, Kolasch & Birch, LLP

(57) ABSTRACT

In a recordable disk recording controller circuit, a data buffer manager receives a command and sends the command to a micro-controller. The micro-controller generates a set of register batches from each command and sends the register data and index of the register batch to a batch register controller. The batch register controller receives the register data and index of the register batch from the micro-controller and stores the received register data and index of the register batch in a batch buffer. The batch register controller retrieves the register batches from the batch buffer and writes the master registers of an encoder controller based on the register index and register data of the register batches after the master registers of the encoder controller are updated into the slave registers of the encoder controller. The encoder controller generates control signals to a recording circuit depending on updated slave registers. Such control signals cause the recording circuit to record a signal representative of signal data on a recordable disk located in a recordable disk driver.

8 Claims, 7 Drawing Sheets

RECORDABLE DISK RECORDING CONTROLLER WITH BATCH REGISTER CONTROLLER

BACKGROUND OF THE INVENTION

A. Field of the Invention

The present invention relates to a recordable disk recording controller for use in a multi-media computer system. More particularly, the present invention relates to a recordable compact disk (CD-R)/rewritable compact disk (CD-RW) recording controller with a batch register controller for improving the rate of recording a signal representative of signal data on a CD-R/CD-RW disk.

B. Description of the Related Art

Conventional multi-media computer systems include a CD-R/CD-RW driver for recording multi-media signals on a CD-R/CD-RW disk. One example of the conventional multi-media computer systems is described in the U.S. Pat. No. 5,940,358, which is cited in the following with reference to FIGS. 1(a) and 1(b).

FIG. 1(a) is a block diagram showing a conventional multi-media computer system 10 including a host processor 11, a CD-R/CD-RW controller 12, a micro-controller 13, a buffer 14, a CD-R/CD-RW driver 15, a ROM 16, and a RAM 17. FIG. 1(b) is a flow-chart illustrating the method employed by the conventional multi-media computer system 10 for recording a signal representative of signal data on a CD-R/CD-RW disk (not shown). The host processor 11 comprises a central processing unit to send a multi-media signal, encoded as signal data, and commands to specify information required for recording the signal.

The CD-R/CD-RW controller 12 receives signal data (step 110 shown in FIG. 1(b)) and commands from the host processor 11, and generates recording signals to record on the CD-R/CD-RW disk a signal representative of signal data. The CD-R/CD-RW controller 12 sends the commands to the micro-controller 13, which in turn generates a set of control signals to cause the CD-R/CD-RW controller 12 to record on the CD-R/CD-RW disk a signal representative of signal data. The CD-R/CD-RW controller 12 stores in the buffer 14 signal data received from the host processor 11. In response to control signals generated by the micro-controller 13, the CD-R/CD-RW controller 12 retrieves signal data from the buffer 14 and generates recording signals to record a signal representative of signal data on the CD-R/CD-RW disk located in the CD-R/CD-RW driver 15.

To generate such control signals, the micro-controller 13 generates a table corresponding to each command (step 120 shown in FIG. 1(b)) and generates control signals from the table. The ROM 16 stores information used to generate such table, and the micro-controller 13 accordingly accesses the ROM 16 to generate the table corresponding to a command. A table contains information necessary for encoding signal data on several sectors during a recording operation.

In the conventional multi-media computer system, the micro-controller 13 stores in the RAM 17 a table generated corresponding to each command (step 130 shown in FIG. 1(b)). The micro-controller 13 then accesses such a table from the RAM 17, and generates control signals to the CD-R/CD-RW controller 12 using information in the table (step 140 shown in FIG. 1(b)). Due to such access, the micro-controller 13 potentially accesses the RAM 17 to generate control signals for recording signal data on each sector.

One problem with such a conventional multi-media computer system 10 is that the micro-controller 13 may not have enough throughput performance to support high-speed recording requirements of current computer systems because the micro-controller 13 may make a high number of accesses to the RAM 17 for accessing information in a table.

Due to the throughput performance problems and consequent inability to generate control signals at a sufficient speed, the micro-controller 13 may fail to generate control signals at a corresponding rate at which signal data is received by the CD-R/CD-RW controller 12. Due to such failure, the CD-R/CD-RW controller 12 misses recording a portion of signal data on the CD-R/CD-RW disk located in CD-R/CD-RW driver 15. The quality of recorded signals therefore is unacceptable.

SUMMARY OF THE INVENTION

In view of the above-described drawbacks of the conventional CD-R/CD-RW recording controller, an object of the present invention is to provide a recordable disk recording controller that improves the communication efficiency between the encoder controller and the micro-controller. As a result, the recordable disk recording controller according to the present invention never misses recording signal data and achieves the acceptable quality of recoded signals.

Another object of the present invention is to provide a computer system equipped with a recordable disk recording controller whose throughput performance is enhanced. As a result, the recordable disk recording controller according to the present invention is not a performance bottleneck as in the conventional multi-media computer system during a recording operation.

According to the present invention, a recordable disk recording controller comprises a host interface for receiving a set of signal data and a command from a host processor. A data buffer manager receives the signal data and the command from the host interface and sends the command to a micro-controller. The micro-controller generates a set of register batches from each command and sends the register data and index of the register batch to a batch register controller. The batch register controller receives the register data and index of the register batch from the micro-controller and stores the received register data and index of the register batch in a batch buffer.

Moreover, the batch register controller retrieves the register batches from the batch buffer and writes the master registers of a encoder controller based on the register index and register data of the register batches after the master registers of the encoder controller are updated into the slave registers of the encoder controller. The slave registers of the encoder controller are updated after finishing what should be done according to previous slave registers. The encoder controller generates control signals to a recording circuit depending on updated slave registers. Such control signals cause the recording circuit to record a signal representative of signal data on a recordable disk located in a recordable disk driver.

Therefore, the micro-controller only needs to send the register data that should be changed. Since the number of data sent by the micro-controller is fewer than the prior art, the present invention improves the communication efficiency between the encoder controller and the micro-controller.

BRIEF DESCRIPTION OF THE DRAWINGS

The above-mentioned and other objects, features, and advantages of the present invention will become apparent with reference to the following detailed descriptions and accompanying drawings, wherein:

FIG. 1 (a) is a block diagram showing a conventional multi-media computer system, while

FIG. 3(a) is a block diagram showing a multi-media computer system according to a second embodiment of the present invention, while

DETAILED DESCRIPTION OF THE PREFERRED EMBODIMENTS

The preferred embodiments according to the present invention will be described in detail with reference to the drawings.

Figure 1A:
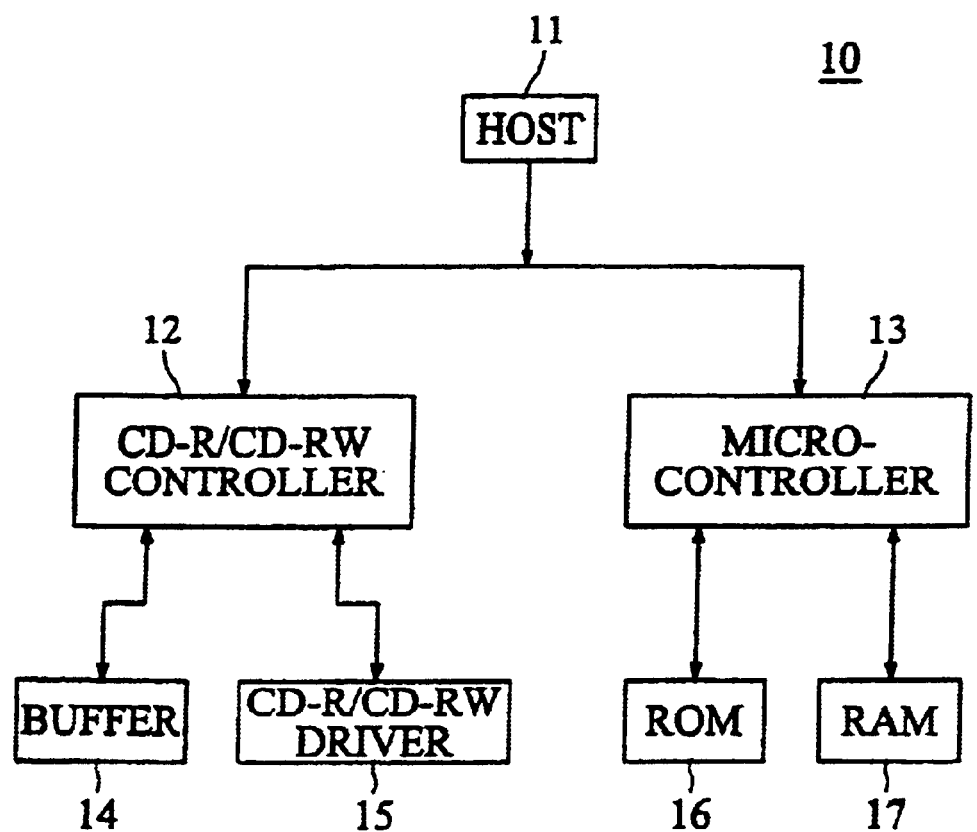
Figure 1B:
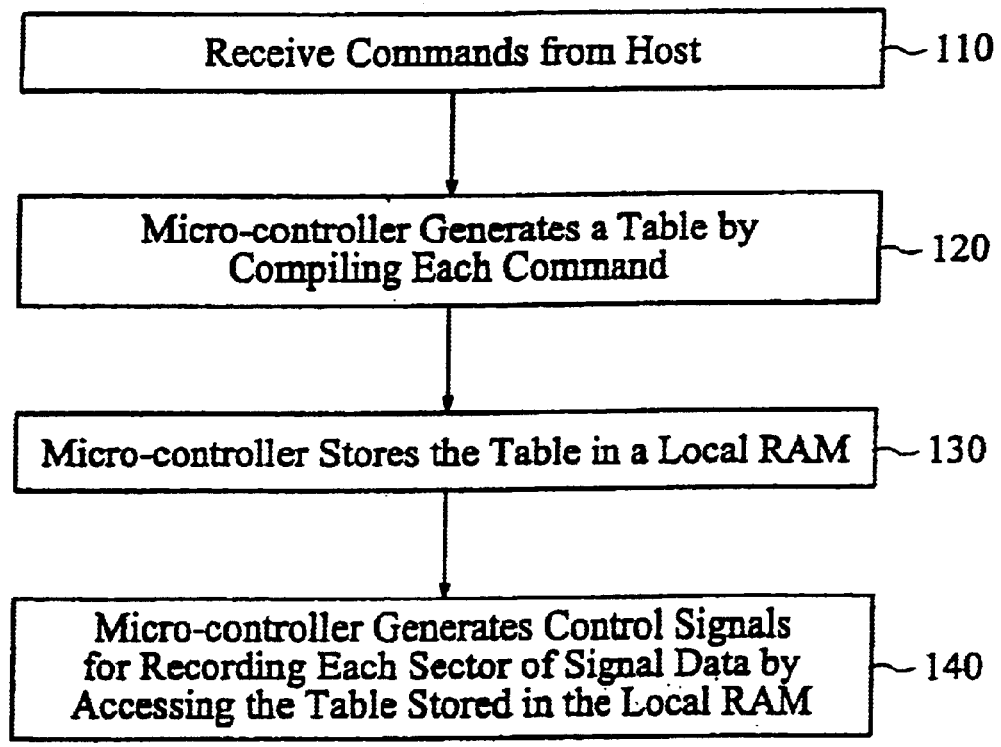
FIG. 1(b) is a flow chart illustrating a method employed by the conventional multi-media computer system for recording a signal representative of signal data on a recordable disk.
Figure 2A:
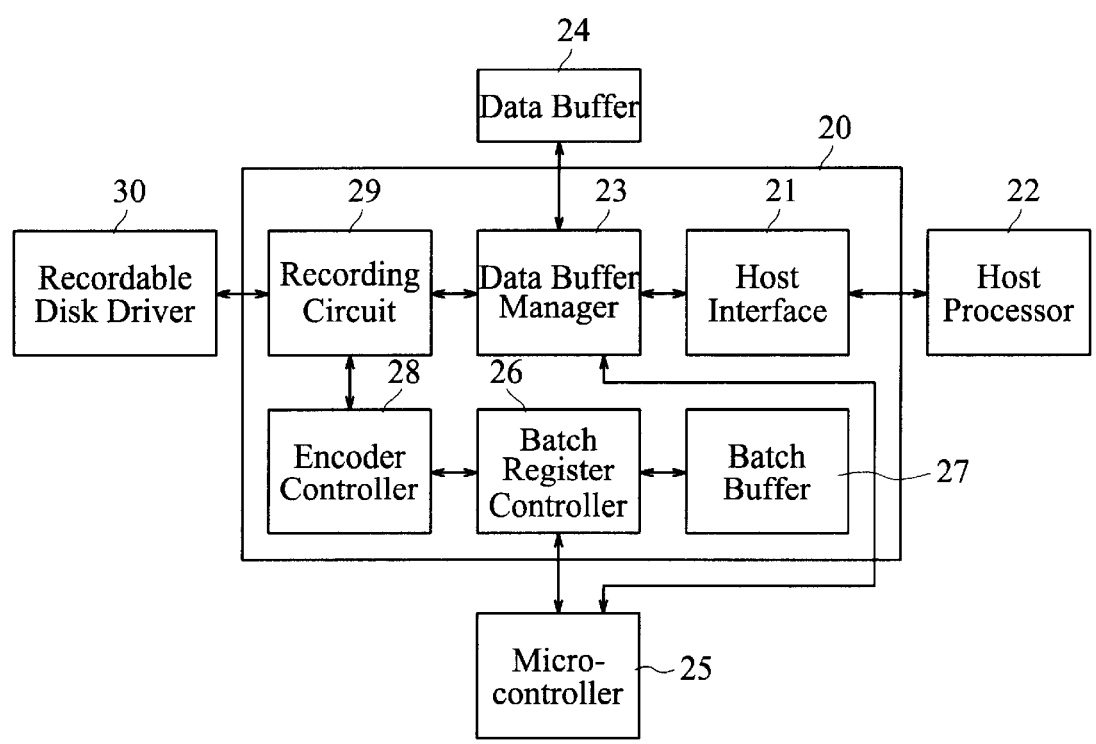
FIG. 2(a) is a block diagram showing a multi-media computer system according to a first embodiment of the present invention including a batch register controller and a batch buffer.
Figure 2B:
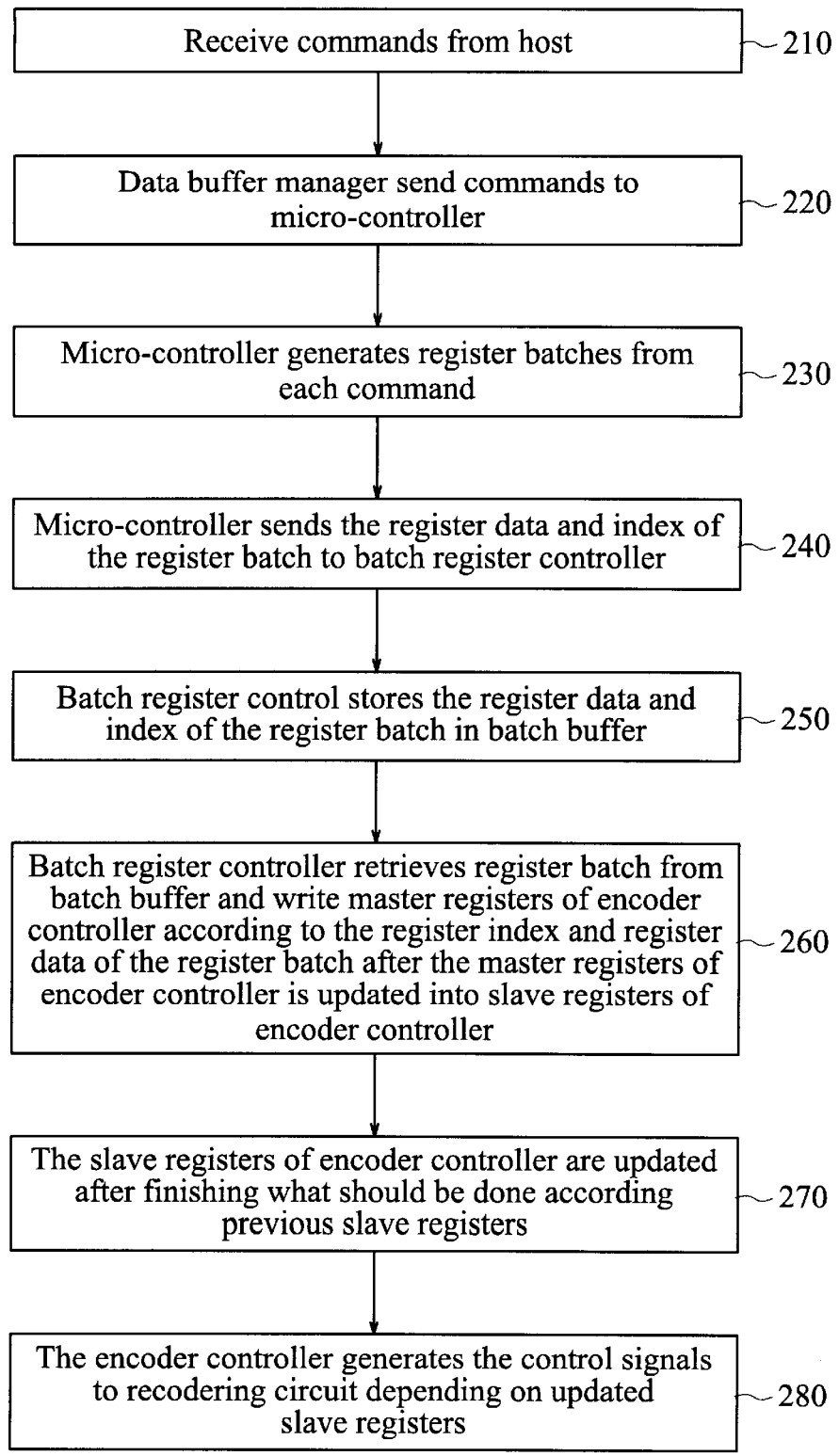
FIG. 2(b) is a flow chart illustrating a method employed by the multi-media computer system of FIG. 2(a) for recording a signal representative of signal data on a recordable disk.

Referring to FIGS. 2(a) and 2(b), a recordable disk controller 20 according to a first embodiment of the present invention performs a recording function based on a flow chart shown in FIG. 2(b), thereby recording a signal representative of a set of signal data on a recordable disk, such as a CD-R or a CD-RW. A host interface 21 receives signal data and commands from a host processor 22 in step 210. The received commands include CUE-sheet commands that are well known in the industry. The host interface 21 uses a conventional standard such as a small computers systems interface (SCSI) or ATAPI to receive commands and data from the host processor 22.

A data buffer manager 23 receives commands and signal data from the host interface 21, and then stores the received signal data in a data buffer 24. The data buffer manager 23 according to the first embodiment of the present invention further sends the commands to a micro-controller 25 in step 220. Next in step 230, the micro-controller 25 generates a set of register batches corresponding to each command.

Subsequently, the micro-controller 25 sends the register data and index of the register batch to a batch register controller 26 in step 240. Hence, the micro-controller 25 according to the present invention does not generate all control signals to store in its local RAM (not shown) and then send what is required to the recordable disk controller 20 as in the prior art, but merely sends the register data and index of the register batch to the batch register controller 26 instead. As the micro-controller 25 does not fetch such control signals from its local RAM when they are required urgently, the micro-controller 25 is no longer a performance bottleneck in the computer system as in the prior art.

The batch register controller 26 receives the register data and index of the register batch from the micro-controller 25, and then stores the received register data and index of the register batch in a batch buffer 27 in step 250. According to the present invention, an encoder controller 28 controlled by internal controller registers is provided in the recordable disk controller 20. Therefore in step 260, the batch register controller 26 retrieves the register batches from the batch buffer 27 and writes the master registers of an encoder controller 28 based on the register index and register data of the register batches after the master registers of the encoder controller 28 are updated into the slave registers of the encoder controller 28.

Referring to step 270, the slave registers of the encoder controller 28 are updated after finishing what should be done according to previous slave registers. Next in step 280, the encoder controller 28 generates control signals to a recording circuit 29 depending on updated slave registers. Such control signals cause the recording circuit 29 to record a signal representative of signal data on a recordable disk (not shown) located in a recordable disk driver 30. As described above, the recordable disk may be a CD-R, a CD-RW, or the like. More specifically, the recording circuit 29 includes a servo controller, an EFM modulation function, and an interface with the recordable disk driver 30 and is controlled by the encoder controller 28 to do C1, C2, and C3 encoding.

Figure 2C:
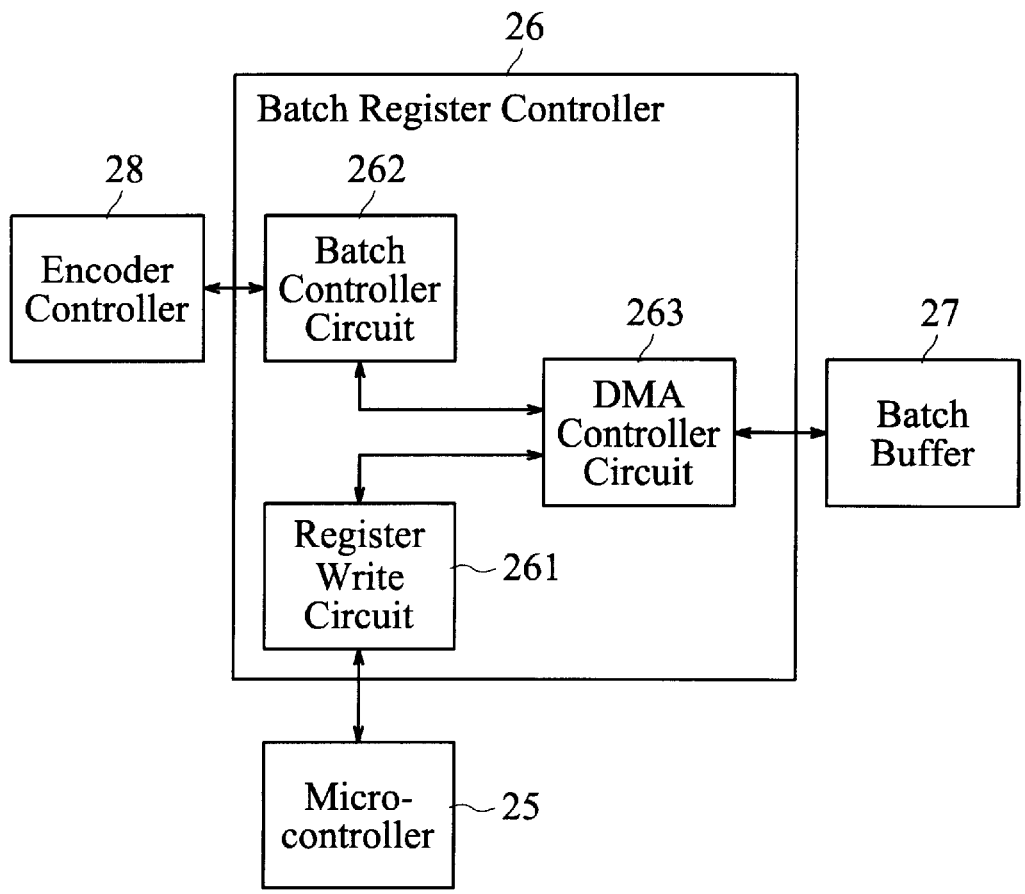
FIG. 2(c) is a block diagram showing a batch register controller in the multi-media computer system of FIG. 2(a)

FIG. 2(c) is a block diagram showing the batch register controller according to the first embodiment of the present invention. The batch register controller 26 includes a register write circuit 261, a batch controller circuit 262, and a direct memory access (DMA) controller circuit 263. The register write circuit 261 is coupled to the micro-controller 25 for receiving a set of encoder controller register programming batches from the micro-controller 25. The batch controller circuit 262 is coupled to the encoder controller 28 for updating the registers of the batch controller circuit 262 upon being allowed by the encoder controller 28. The DMA controller circuit 263 is coupled to the register write circuit 261, the batch controller circuit 262, and the batch buffer 27. The DMA controller circuit 263 receives the request from the micro-controller 25 to write the data of the programming batch through the data buffer manager 23, and then stores the received register data and index of the register batch in the batch buffer 27. In addition, the DMA controller circuit 263 receives the request from the batch controller circuit 262 to read the data of the programming batch through the data buffer manager 23.

Figure 3A:
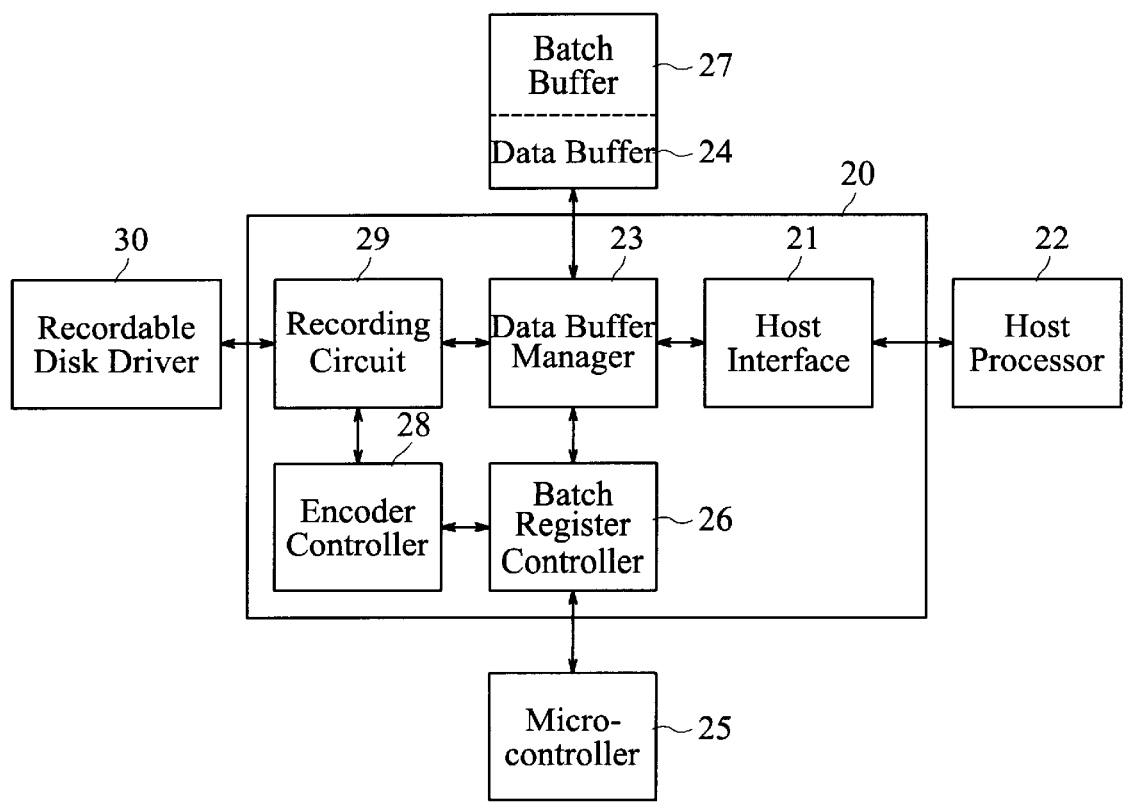

FIG. 3(a) is a block diagram showing a multi-media computer system according to a second embodiment of the present invention. The second embodiment differs from the first embodiment in the arrangement of the batch buffer 27. More specifically, the batch buffer in the second embodiment is incorporated with the data buffer 24. Therefore, the second embodiment saves the space occupied by the recordable disk controller 20.

Figure 3B:
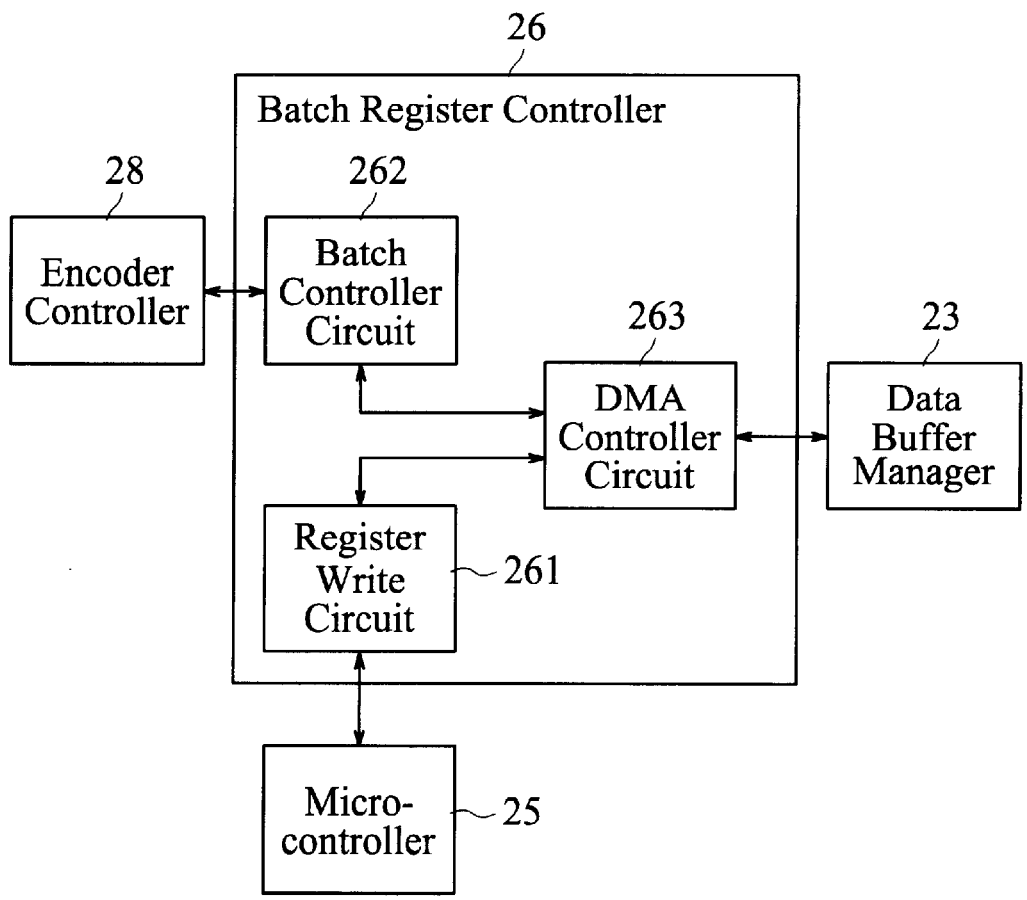
FIG. 3(b) is a block diagram showing a batch register controller in the multi-media computer system of FIG. 3(a).

FIG. 3(b) is a block diagram showing the batch register controller according to the second embodiment of the present invention. The batch register controller 26 includes a register write circuit 261, a batch controller circuit 262, and a DMA controller circuit 263. The register write circuit 261 is coupled to the micro-controller 25 for receiving a set of encoder controller register programming batches from the micro-controller 25. The batch controller circuit 262 is coupled to the encoder controller 28 for updating the registers of the batch controller circuit 262 upon being allowed by the encoder controller 28. The DMA controller circuit 263 is coupled to the register write circuit 261, the batch controller circuit 262, and the data buffer manager 23. The DMA controller circuit 263 receives the request from the micro-controller 25 to write the data of the programming batch through the data buffer manager 23. In addition, the DMA controller circuit 263 receives the request from the batch controller circuit 262 to read the data of the programming batch through the data buffer manager 23.

According to the present invention, the micro-controller sends the register data and index of the register batch to the batch buffer, and then the batch buffer writes the register data and index of the register batch into the encoder controller. Therefore, the micro-controller only needs to send the register data that should be changed. The present invention successfully improves the communication efficiency between the encoder controller and the micro-controller.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A recordable disk controller for use in a system to record a set of signal data on a recordable disk, the system having a host processor for generating the set of signal data and a command and having a micro-controller for generating a set of encoder controller register programming batches corresponding to the command, the recordable disk controller comprising:
   a host interface circuit for receiving the set of signal data and the command from said host processor;
   a data buffer manager coupled to said host interface circuit, for sending the command to said micro-controller;
   a batch register controller coupled to said micro-controller, for receiving the set of encoder controller register programming batches from said micro-controller;
   a batch buffer coupled to said batch register controller, for receiving and storing the set of encoder controller register programming batches from said batch register controller;
   a recording circuit for generating a set of recording signals for recording on said recordable disk according to the set of signal data; and
   an encoder controller coupled to said recording circuit and said batch register controller, for generating a set of control signals, to cause said recording circuit to generate the set of recording signals.

2. A recordable disk controller according to claim 1, wherein said batch register controller comprises:
   a register write circuit coupled to said micro-controller, for receiving the set of encoder controller register programming batches from said micro-controller;
   a batch controller circuit having registers and coupled to said encoder controller, said batch controller circuit updating the registers upon being allowed by said encoder controller; and
   a DMA controller circuit coupled to said register write circuit, said batch buffer, and said batch controller circuit, for receiving a request from said micro-controller to write the data of the encoder controller register programming batches into said batch buffer, and receiving a request from said batch controller circuit to read the data of the encoder controller register programming batches from said batch buffer.

3. A recordable disk controller for use in a system to record a set of signal data on a recordable disk, the system having a host processor for generating the set of signal data and a command and having a micro-controller for generating a set of encoder controller register programming batches corresponding to the command, the recordable disk controller comprising:
   a host interface circuit for receiving the set of signal data and the command from said host processor;
   a data buffer manager coupled to said host interface circuit, for sending the command to said micro-controller;
   a batch register controller coupled to said micro-controller and said data buffer manager, for receiving the set of encoder controller register programming batches from said micro-controller, and sending the set of encoder controller register programming batches to said data buffer manager;
   a recording circuit for generating a set of recording signals for recording on said recordable disk the set of signal data; and
   an encoder controller coupled to said recording circuit and said batch register controller, for generating a set of control signals, to cause said recording circuit to generate the set of recording signals.

4. A recordable disk controller according to claim 3, wherein said batch register controller comprises:
   a register write circuit coupled to said micro-controller, for receiving the set of encoder controller register programming batches from said micro-controller;
   a batch controller circuit having registers and coupled to said encoder controller, said batch controller circuit updating the registers upon being allowed by said encoder controller; and
   a DMA controller circuit coupled to said register write circuit, said data buffer manager, and said batch controller circuit, for receiving a request from said micro-controller to write the data of the encoder controller register programming batches through said data buffer manager, and receiving a request from said batch controller circuit to read the data of the encoder controller register programming batches through said data buffer manager.

5. A system for recording on a recordable disk a set of signal data from a host processor according to a command from said host processor, the system comprising:
   a micro-controller for generating a set of encoder controller register programming batches corresponding to the command;
   a recordable disk controller for generating a set of control signals to cause said system to record the set of signal data on said recordable disk, said recordable disk controller receiving the set of signal data and the command from said host processor;
   said recordable disk controller comprising:
   a host interface circuit for receiving the set of signal data and the command from said host processor;
   a data buffer manager coupled to said host interface circuit, for sending the command to said micro-controller;
   a batch register controller coupled to said micro-controller, for receiving the set of encoder controller register programming batches from said micro-controller;
   a batch buffer coupled to said batch register controller, for receiving and storing the set of encoder controller register programming batches from said batch register controller;

a recording circuit for generating a set of recording signals for recording on said recordable disk the set of signal data; and an encoder controller coupled to said recording circuit and said batch register controller, for generating a set of control signals, wherein the set of control signals cause said recording circuit to generate the set of recording signals.

6. A system according to claim 5, wherein said batch register controller comprises:

a register write circuit coupled to said micro-controller, for receiving the set of encoder controller register programming batches from said micro-controller;

a batch controller circuit having registers and coupled to said encoder controller, said batch controller circuit updating the registers upon being allowed by said encoder controller; and a DMA controller circuit coupled to said register write circuit, said batch buffer, and said batch controller circuit, for receiving a request from said micro-controller to write the data of the encoder controller register programming batch into said batch buffer, and receiving a request from said batch controller circuit to read the data of the encoder controller register programming batch from said batch buffer.

7. A system for recording on a recordable disk a set of signal data from a host processor according to a command from said host processor, the system comprising:

a micro-controller for generating a set of encoder controller register programming batches corresponding to the command; and a recordable disk controller for generating a set of control signals to cause said system to record the set of signal data on said recordable disk, said recordable disk controller receiving the set of signal data and the command from said host processor;

said recordable disk controller comprising:

a host interface circuit for receiving the set of signal data and the command from said host processor;

a data buffer manager coupled to said host interface circuit, for sending the command to said micro-controller;

a batch register controller coupled to said micro-controller and said data buffer manager, for receiving the set of encoder controller register programming batches from said micro-controller, and sending the set of encoder controller register programming batches to said data buffer manager;

a recording circuit for generating a set of recording signals for recording on said recordable disk the set of signal data; and an encoder controller coupled to said recording circuit and said batch register controller, for generating a set of control signals, to cause said recording circuit to generate the set of recording signals.

8. A system according to claim 7, wherein said batch register controller comprises:

a register write circuit coupled to said micro-controller, for receiving the set of encoder controller register programming batches from said micro-controller;

a batch controller circuit having registers and coupled to said encoder controller, said batch controller circuit updating the registers upon being allowed by said encoder controller; and a DMA controller circuit coupled to said register write circuit, said data buffer manager, and said batch controller circuit, for receiving a request from said micro-controller to write the data of the encoder controller register programming batch through said data buffer manager, and receiving a request from said batch controller circuit to read the data of the encoder controller register programming batch through said data buffer manager.

* * * * *